(12) United States Patent  
Desai et al.

(10) Patent No.: US 8,718,363 B2  
(45) Date of Patent: May 6, 2014

(54) SYSTEMS AND METHODS FOR ANALYZING IMAGE DATA USING ADAPTIVE NEIGHBORHOODING

(75) Inventors: Mukund Desai, Needham, MA (US); Rami Mangoubi, Newton, MA (US)

(73) Assignee: The Charles Stark Draper Laboratory, Inc., Cambridge, MA (US)

(*) Notice: Subject to any disclaimer, the term of this patent is extended or adjusted under 35 U.S.C. 154(b) by 1039 days.

(21) Appl. No.: 12/355,567

(22) Filed: Jan. 16, 2009

(65) Prior Publication Data

US 2009/0180693 A1 Jul. 16, 2009

Related U.S. Application Data

(60) Provisional application No. 61/021,513, filed on Jan. 16, 2008, provisional application No. 61/011,456, filed on Jan. 16, 2008, provisional application No. 61/143,399, filed on Jan. 8, 2009.

(51) Int. Cl.  
*G06K 9/34* (2006.01)

(52) U.S. Cl.  
USPC ............................ 382/173; 382/268; 348/143

(58) Field of Classification Search  
USPC .................................. 382/173, 268; 348/143  
See application file for complete search history.

(56) References Cited

U.S. PATENT DOCUMENTS

| | | | |
|---|---|---|---|
| 4,150,360 A | 4/1979 | Kopp et al. | |
| 4,220,972 A * | 9/1980 | Geokezas et al. | 348/573 |
| 4,771,470 A * | 9/1988 | Geiser et al. | 382/266 |
| 4,905,296 A | 2/1990 | Nishihara | |
| 5,279,298 A | 1/1994 | Flower | |
| 5,526,258 A | 6/1996 | Bacus | |
| 5,757,953 A | 5/1998 | Jang | |
| 5,825,909 A | 10/1998 | Jang | |
| 5,919,464 A | 7/1999 | Mann et al. | |
| 5,989,835 A | 11/1999 | Dunlay et al. | |
| 6,053,865 A | 4/2000 | Sugiyama et al. | |
| 6,103,479 A | 8/2000 | Taylor | |
| 6,128,587 A | 10/2000 | Sjolander | |
| 6,167,146 A | 12/2000 | Rogers et al. | |
| 6,385,332 B1 | 5/2002 | Zahalka et al. | |
| 6,555,802 B2 | 4/2003 | Osipchuk et al. | |
| 6,620,591 B1 | 9/2003 | Dunlay et al. | |
| 6,658,143 B2 | 12/2003 | Hansen et al. | |
| 6,727,071 B1 | 4/2004 | Dunlay et al. | |

(Continued)

FOREIGN PATENT DOCUMENTS

WO   WO-94/11841   5/1994

OTHER PUBLICATIONS

Desai et al., "Robust Non Gaussian Matched Subspace Detectors," EUSIPCO 2002 Conference, Toulouse, France (Sep. 2002).

(Continued)

*Primary Examiner* — Chan Park  
*Assistant Examiner* — Eueng-Nan Yeh  
(74) *Attorney, Agent, or Firm* — Foley & Lardner LLP; Edward A. Gordon

(57) ABSTRACT

The invention relates to methods and systems for extracting information about a scene from a set of image data by interdependently smoothing the data, segmenting the imaged scene into coherent elements by determining edges, and estimating attributes present within the scene. These methods and systems include attribute estimation, adaptive neighborhood adjustment and preferential use of different images or imaging modalities for information extraction.

36 Claims, 6 Drawing Sheets

(56) References Cited

U.S. PATENT DOCUMENTS

| | | | |
|---|---|---|---|
| 6,753,965 | B2 | 6/2004 | Kumar et al. |
| 6,763,128 | B1 | 7/2004 | Rogers et al. |
| 6,778,705 | B2 | 8/2004 | Gutta et al. |
| 6,799,066 | B2 | 9/2004 | Steines et al. |
| 6,898,313 | B2 | 5/2005 | Li et al. |
| 6,903,735 | B2 | 6/2005 | Jeong et al. |
| 6,909,804 | B2 | 6/2005 | Caruso et al. |
| 6,983,074 | B1 | 1/2006 | Clauson et al. |
| 6,996,260 | B1 | 2/2006 | Skands et al. |
| 6,999,620 | B1 | 2/2006 | Harville |
| 7,024,054 | B2 | 4/2006 | Cahill et al. |
| 7,085,765 | B2 | 8/2006 | Zock et al. |
| 7,086,350 | B2 | 8/2006 | Tecott et al. |
| 7,088,845 | B2 | 8/2006 | Gu et al. |
| 7,151,246 | B2 | 12/2006 | Fein et al. |
| 7,200,495 | B2 | 4/2007 | Desai |
| 7,299,088 | B1 | 11/2007 | Thakor et al. |
| 7,302,096 | B2 | 11/2007 | Kim |
| 7,383,237 | B2 | 6/2008 | Zhang et al. |
| 7,885,463 | B2 | 2/2011 | Zhang et al. |
| 8,098,907 | B2 | 1/2012 | Yan et al. |
| 8,199,984 | B2 | 6/2012 | Mori et al. |
| 2001/0012398 | A1 | 8/2001 | Todoroki |
| 2001/0024529 | A1* | 9/2001 | Chao et al. ............ 382/240 |
| 2001/0052933 | A1* | 12/2001 | Nybo et al. ............ 348/207 |
| 2002/0025514 | A1 | 2/2002 | Jaworski et al. |
| 2002/0052551 | A1 | 5/2002 | Sinclair et al. |
| 2003/0056799 | A1* | 3/2003 | Young et al. ............ 128/922 |
| 2003/0058111 | A1 | 3/2003 | Lee et al. |
| 2003/0058341 | A1 | 3/2003 | Brodsky et al. |
| 2003/0077569 | A1 | 4/2003 | Clausell et al. |
| 2003/0100024 | A1 | 5/2003 | Cassells et al. |
| 2003/0149535 | A1 | 8/2003 | Sudo et al. |
| 2003/0185450 | A1 | 10/2003 | Garakani et al. |
| 2004/0018485 | A1 | 1/2004 | Ravkin et al. |
| 2004/0063162 | A1 | 4/2004 | Dunlay et al. |
| 2004/0072254 | A1 | 4/2004 | Callamaras et al. |
| 2004/0175058 | A1 | 9/2004 | Jojic et al. |
| 2004/0197015 | A1* | 10/2004 | Fan et al. ............ 382/128 |
| 2004/0258285 | A1 | 12/2004 | Hansen et al. |
| 2005/0232506 | A1 | 10/2005 | Smith et al. |
| 2006/0170769 | A1 | 8/2006 | Zhou |
| 2006/0280351 | A1 | 12/2006 | Luping et al. |
| 2007/0019846 | A1 | 1/2007 | Bullitt et al. |
| 2007/0122039 | A1 | 5/2007 | Zhang et al. |
| 2007/0177825 | A1 | 8/2007 | Suzuki et al. |
| 2007/0296721 | A1 | 12/2007 | Chang et al. |
| 2008/0002856 | A1 | 1/2008 | Ma et al. |
| 2008/0069411 | A1* | 3/2008 | Friedman et al. ............ 382/118 |
| 2008/0089665 | A1* | 4/2008 | Thambiratnam et al. ........ 386/95 |
| 2008/0243439 | A1 | 10/2008 | Runkle et al. |
| 2008/0304743 | A1 | 12/2008 | Tang et al. |
| 2009/0005693 | A1 | 1/2009 | Brauner et al. |
| 2009/0060352 | A1 | 3/2009 | Distante et al. |
| 2009/0180693 | A1 | 7/2009 | Desai et al. |
| 2009/0312985 | A1 | 12/2009 | Eliazar |
| 2009/0328239 | A1 | 12/2009 | Brauner et al. |
| 2010/0002929 | A1 | 1/2010 | Sammak et al. |
| 2010/0033484 | A1 | 2/2010 | Kim et al. |
| 2010/0111370 | A1 | 5/2010 | Black et al. |
| 2010/0158372 | A1 | 6/2010 | Kim et al. |
| 2010/0208942 | A1 | 8/2010 | Porter et al. |
| 2011/0013836 | A1 | 1/2011 | Gefen et al. |
| 2011/0050878 | A1 | 3/2011 | Wells et al. |
| 2011/0103657 | A1 | 5/2011 | Kang et al. |
| 2011/0110577 | A1 | 5/2011 | Mangoubi et al. |
| 2011/0134242 | A1 | 6/2011 | Loubser et al. |
| 2011/0188728 | A1 | 8/2011 | Sammak et al. |
| 2012/0069051 | A1 | 3/2012 | Hagbi et al. |

OTHER PUBLICATIONS

Desai et al., "Subspace learning and innovation characterization in generalized Gaussian noise," IEEE 37th Asilomar Conference on Signals, Systems and Computers, Monterey, Calif. (Nov. 2003).

Desai, et al., "Non Gaussian Robust Matched Subspace Detectors and Signal Design Analysis for a Class of Separable Subspaces," Proceedings of the 3rd IEEE Sensor Array and Multichannel Signal Processing Workshop, Barcelona, Spain, 225-229 (Jul. 2004).

Kociolek et al., "Discrete Wavelet Transform-Derived Features for Digital Image Texture Analysis," Retrieved from www.eletel.p.lodz.pl/cost.pdf_9.pdf Jul. 21, 2008.

Ma et al., "A Comparison of Wavelet Transform Features for Texture Image Annotation," International Conference on Image Processing Oct. 23-25, 1995.

Osuna, E., Support Vector Machines: Training and Applications (Mar. 1997).

Agustin et al., Robust Failure Detection for Reentry Vehicle Attitude Control Systems, Journal of Guidance, Control & Dynamics, 22(6):839-845 (Nov.-Dec. 1999).

Bovik et al., Multichannel Texture Analysis Using Localized Spatial Filters,01D IEEE Transactions on Pattern Analysis and Machine Intelligence, 12(1):55-73 (Jan. 1990).

Burges, C., A Tutorial on Support Vector Machines for Pattern Recognition, Data Mining and Knowledge Discovery, 2:121-167 (Jun. 1998).

Chang et al., Texture Analysis and Classification with Tree-Structured Wavelet Transform, IEEE Transactions on Image Processing, 2(4):429-441 (Oct. 1993).

Csiszar, I., "Why least squares and maximum entropy? An axiomatic approach to inference for linear inverse problems," The Annals of Statistics, 19(4):2032-2066 (Dec. 1991).

Deckert et al., F-8 DFBW Sensor Failure Identification Using Analytic Redundancy, IEEE Transactions on Automatic Control, 22(5):795-803 (Oct. 1977).

Desai et al., Adaptive Robust Constrained Matched Filter and Subspace Detection, Conference Record of the IEEE 36th Asilomar Conference on Signals, Systems and Computers, Monterey, Calif., 768-772 (Nov. 3-6, 2002).

Desai et al., Diffusion Tensor Model Based Smoothing, IEEE International Symposium on Biomedical Imaging, pp. 705-708 (Jun. 2002).

Desai et al., Dual Redundant Sensor FDI Techniques Applied to the NASA F8C DFBW Aircraft, Proc. AIAA Conference on Guidance and Control, 502-513 (Jan. 1976).

Desai et al., Functional MRI Activity Characterization Using Response Time Shift Estimates From Curve Evolution, IEEE Transactions on Medical Imaging, 21(11):1402-1412 (Nov. 2002).

Desai et al., Functional MRI Activity Characterization: An Estimation and Decision Theoretic Approach, Medical Imaging Systems Technology, 5:251-295 (2005), Published before this application Jan. 2008.

Desai et al., Model Based Variational Smoothing and Segmentation for Diffusion Tensor Imaging in the Brain, Neuroinformatics, 4(3):217-233 (Summer 2006).

Desai et al., Robust Gaussian and Non-Gaussian Matched Subspace Detection, IEEE Transactions on Signal Processing, 51(12):3115-3127 (Dec. 2003).

Desai et al., Robust Subspace Learning and Detection in Laplacian Noise and Interference, IEEE Transactions on Signal Processing, 55(7):3585-3595 (Jul. 2007).

Desai et al., Subspace Learning in Non-Gaussian Log-Concave Noise, Conference Record of the IEEE 38th Asilomar Conference on Signals, Systems and Computers, 2:2364-2369 (Nov. 7-10, 2004).

Dietterich et al., Solving Multiclass Learning Problems via Error-Correcting Output Codes, Journal of Artificial Intelligence Research 2. 263-286 (Jan. 1995).

Do et al., Wavelet-Based Texture Retrieval Using Generalized Gaussian Density and Kullback-Leibler Distance, IEEE Transaction on Image Processing, 11(2):146-158 (Feb. 2002).

Galloway, Mary. Texture Analysis Using Gray Level Run Lengths, Computer Graphics and Image Processing, 4:172-179 (Jun. 1975).

Haralick et al., Textural Features for Image Classification, IEEE Transactions on Systems, Man and Cybernetics, SMC-3(6):610-621 (Nov. 1973).

Haralick Robert M. Statistical and Structure Approaches to Texture, Proceedings of the IEEE, 67(5):786-804 (May 1979).

(56) References Cited

OTHER PUBLICATIONS

Hermes et al. Feature Selection for Support Vector Machines, IEEE Computer Society, 2:712-715 (Sep. 2000).
Jain et al., Unsupervised Texture Segmentation Using Gabor Filters, Pattern Recognition, 24(12):1167-1186 (May 1991).
Krupadanam et al., Multivariable Adaptive Control Design with Applications to Autonomous Helicopters, Journal of Guidance Control and Dynamics, 25(5):843-851 (Sep.-Oct. 2002).
Laws, K., Rapid Texture Identification, SPIE vol. 238 Image Processing for Missile Guidance. 376-380 (Jul. 29-Aug. 1, 1980).
Mangin, J. et al., A framework based on spin glass models for the inference of anatomical connectivity from diffusion-weighted MR data—a technical review, NMR in Biomedicine, 15:481-492 (Jan. 2002).
Mangoubi et al., A Robust Failure Detection and Isolation Algorithm, Proceedings of the 34th Conference on Decision & Control, 2377-2382 (Dec. 1995).
Mao et al., Texture Classification and Segmentation Using Multiresolution Simultaneous Autoregressive Models, Pattern Recognition, 25(2):173-188 (Feb. 1992).
Mulkern, R. et al., Complementary aspects of diffusion imaging and fMRI; I: structure and function, Magnetic Resonance Imaging, 24(4):463-474 (Jan. 2006).
Parker, G., Analysis of MR diffusion weighted images, British Journal of Radiology, Special Issue, S176-S185 (Dec. 2004).
Randen et al., Filtering for Texture Classification: A Comparative Study, IEEE Transactions on Pattern Analysis and Machine Intelligence, 21(4):291-310 (Apr. 1999).
Reed et al., A Review of Recent Texture Segmentation and Feature Extraction Techniques, CVGIP: Image Understanding, 57(3):359-372 (May 1993).
Rennie et al., Improving Multiclass Text Classification with the Support Vector Machine, (Oct. 2001).
Rifkin, Ryan Michael, Everything Old is New Again: A Fresh Look at Historical Approaches in Machine Learning, Paper Submitted to Sloan School of Management Science (Sep. 2002).
Rui et al., Image Retrieval: Current Techniques, Promising Directions, and Open Issues, Journal of Visual Communication and Image Representation, 10:39-62 (Jan. 1999).
Shah, Jayant, Gray Skeletons and Segmentation of Shapes, Computer Vision and Image Understanding 99 (Jul. 2005).
Takahashi et al., Decision-Tree-Based Multiclass Support Vector Machines, Proceedings of the 9th International Conference on Neural Information Processing, 3:1418-1422 (Nov. 2002).
Tuceryan et al., Chapter 2.1, Texture Analysis, Handbook of Pattern Recognition and Computer Vision (2nd Edition), World Scientific Publishing Co., pp. 207-248 (1998), Published before this application Jan. 2008.
Unser, Michael, Sum and Difference Histograms for Texture Classification, IEEE Transactions on Pattern Analysis and Machine Intelligence, Pami-8(1):118-125 (Jan. 1986).
Van De Wouwer et al., Statistical Texture Characterization from Discrete Wavelet Representations, IEEE Transactions on Image Processing, 8(4):592-598 (Apr. 1999).
Willsky, A., Multiresolution Markov Models for Signal and Image Processing, Proceedings of the IEEE, 90(8):1396-1458 (Aug. 2002).
Desai et al., "Retinal venous caliber abnormality: Detection and analysis using matrix edge fields-based simultaneous smoothing and segmentation," Applied Imagery Pattern Recognition Workshop (AIPRW), 1-6 (Oct. 14, 2009).
Fiorin et al., "Fast adaptive axis-based segmentation of retinal vessels through matched filters" 11th International Congress of the IUPESM, Medical Physics and Biomedical Engineering, World Congress 2009. Biomedical Engineering for Audiology, Opthalmology, Emergency & Dental Medicine, 145-148 (Sep. 7-12, 2009).
Sukkaew et al., "Automatic tortuosity-based Retinopathy of Prematurity screening system," IEICE Transactions on Information and Systems, vol. E91-D, No. 12 2868-2874, (Dec. 2008).
Can et al., "Automated model based segmentation, tracing and analysis of retinal vasculature from digital fundus images." State-of-the-Art Angiography, Applications and Plaque Imaging Using MR, CT, Ultrasound and X-rays (2003): pp. 1-91, (published before this application Jan. 2008).
Choi, et al. "An Efficient and Accurate Algorithm for Extracting a Skeleton", Proceedings of the International Conference on Pattern Recognition, Sep. 3-7, 2000, IEEE, pp. 742-745.
Cremazy et al., "Imaging in situ protein-DNA interactions in the cell nucleus using FRET-FLIM," Exp Cell Res., 309:390-396 (Oct. 1, 2005).
Desai et al., "Non Gaussian Robust Matched Subspace Detectors and Signal Design Analysis for a Class of Separable Subspaces," Proceedings of the 3rd IEEE Sensor Array and Multichannel Signal Processing Workshop, Barcelona, Spain, 225-229 (Jul. 2004).
Desai et al., "Non Gaussian Subspace Learning in the Presence of Interference," 3rd IEEE Sensor Array and Multichannel Signal Processing Workshop, Barcelona, Spain (Jul. 2004).
Desai et al., "Robust Constrained Non Gaussian FMRI Detection," 3rd IEEE International Symposium on Biomedical Imaging, Arlington, Virginia, 1076-1079 (Apr. 2006).
Desai et al., Robust Non Gaussian Matched Subspace Detectors, EUSIPCO 2002 Conference, Toulouse, France (Sep. 2002).
Desai, et al., "Noise Adaptive Matrix Edge Field Analysis of Small Sized Heterogeneous Onion Layered Textures for Characterizing Human Embryonic Stem Cell Nuclei," IEEE International Symposium on Biomedical Imaging, pp. 1386-1389 (Jun. 28-Jul. 1, 2009).
Goh et al., "ADRIS: an Automatic Diabetic Retinal Image Screening system," Medical Data Mining and Knowledge Discovery, Springer-Verlag, 2001, pp. 181-210, (published before this application Jan. 2008).
International Search Report in PCT/US2010/052950, dated Mar. 16, 2011.
Jeffreys, "Support Vector Machine and Parametric Wavelet-Based Texture Classification of Stem Cell Images," Masters Thesis, Operations Research Center, MIT, Cambridge, Mass (2004), (published before this application Jan. 2008).
Kociolek et al., "Discrete Wavelet Transform—Derived Features for Digital Image Texture Analysis," Proc. of International Conference on Signals and Electronic System, pp. 163-168, Sep. 18-21, 2001 (Retrieved from www.eletel.p.lodz.pl/cost.pdf_9.pdf Jul. 21, 2008).
Li et al., "Cell Population Tracking and Lineage Construction with Spatiotemporal Context," Medical Image Analysis, 12(5):546-566 (Oct. 2008).
Lowry et al., "Classification of Human Embryonic Stem Cell Colonies Using Multiresolution Non-Gaussian Statistical Texture Models," Submitted (Jan. 3, 2009).
Ma et al., "A Comparison of Wavelet Transform Features for Texture Image Annotation," International Conference on Image Processing, pp. 256-259 (Oct. 23-25, 1995).
Mangoubi et al., "Performance Evaluation of Multiresolution Texture Analysis of Stem Cell Chromatin," Fifth IEEE International Symposium of Biomedical Imaging, Washington, D.C. (May 2008).
Mangoubi R, Jeffrey C, Copeland A, Desai M, Sammak P, Non-Invasive Image Based Support Vector Machine Classification of HESC's. In: International Symposium on Biomedical Imaging, Arlington, VA (Apr. 12-15, 2007).
Mendonca et al., "Segmentation of Retinal Blood Vessels by Combining the Detection of Centerlines and Morphological Reconstruction," IEEE Transactions on Medical Imaging, 25:9, pp. 1200-1213 (Sep. 2006).
Office Action in U.S. Appl. No. 12/905,929 dated Jun. 25, 2013.
Reniers et al., "Skeleton-based Hierarchical Shape Segmentation," IEEE Int. Conference on Shape Modeling and Applications, pp. 179-188 (Jun. 2007).
Ricci, et al., "Retinal Blood Vessel Segmentation using Line Operators and Support Vector Classification," IEEE Transactions on Medical Imaging, 26:10, pp. 1357-1365, (Oct. 2007).
Smith et al., "Transform Features for Texture Classification and Discrimination in Large Image Databases," Proceedings of IEEE International Conference on Image Processing, Austin, TX (Nov. 1994).
Sofka et al., "Retinal Vessel Centerline Extraction using Multiscale Matched Filters, Confidence and Edge Measures," IEEE Trans. on Medical Imaging, 25:12, pp. 1531-1546, (Dec. 2006).

(56) References Cited

OTHER PUBLICATIONS

Walter, T. et al. "A Contribution of Image Processing to the Diagnosis of Diabetic Retinopathy—Detection of Exudates in Color Fundus Images of the Human Retina", IEEE Transactions on Medical Imaging, vol. 21, No. 10, pp. 1236-1243 (Oct. 2002).

Walter, T. et al. "Segmentation of Color Fundus Images of the Human Retina: Detection of the Optic Disc and the Vascular Tree Using Morphological Techniques", Lecture Notes in Computer Science, vol. 2199, pp. 282-287 (Oct. 2001).

Wong et al., "Automated detection of kinks from blood vessels for optic cup segmentation in retinal images," Proc. of SPIE vol. 7260, pp. 1-8 (Mar. 3, 2009).

Zana et al., "A Multimodal Registration Algorithm of Eye Fundus Images Using Vessels Detection and Hough Transform," IEEE Trans. on Medical Imaging, 18:5, pp. 419-428, (May 1999).

* cited by examiner identical neighborhoods neighborhoods with variable size, identical shape neighborhoods with variable size, shape, and orientation

510

520

530

540

550

560

570

SYSTEMS AND METHODS FOR ANALYZING IMAGE DATA USING ADAPTIVE NEIGHBORHOODING

CROSS-REFERENCE TO RELATED APPLICATION

This application claims the benefit of U.S. Provisional Application No. 61/021,513, "An Energy Functional Framework for Simultaneous Learning, Smoothing, Segmentation, and Grouping in a Low SNR, Sparse Data Environment," filed Jan. 16, 2008; U.S. Provisional Application No. 61/011,456, "Image-based Methods for Measuring Global Nuclear Patterns as Epigenetic Markers of Cell Differentiation," filed Jan. 16, 2008; and U.S. Provisional Application No. 61/143,399, "Image-based Methods for Assessing Cells," filed Jan. 8, 2009, each of which is hereby incorporated by reference herein in its entirety.

STATEMENT REGARDING FEDERALLY SPONSORED RESEARCH OR DEVELOPMENT

Work described herein was funded, in whole or in part, by Grant No. RO1-EB006161-01A2 from the National Institutes of Health (NIH/NIBIB) and NINDS/NIH Grant No. 5-R01-NS34189-10 from the National Institute of Neurological Disorders and Stroke. The United States Government has certain rights in this invention.

FIELD OF THE INVENTION

The present invention is directed to methods and apparatus for simultaneous smoothing, segmentation and attribute estimation within image data representing an imaged scene.

BACKGROUND OF THE INVENTION

The methods and apparatus of the present invention were inspired by the challenges of medical imaging. Medical image data is often time-varying, multi-dimensional, subject to imaging artifacts and sensitive to noise. Several examples will illustrate the variety of challenges and performance requirements presented by different imaging techniques. A first example is perfusion imaging, in which textural patterns are to be detected. A second example is the vector field data produced by functional imaging, which changes with time. Analyzing this time-varying data requires focusing on time periods that exhibit significant response of the physiological system being imaged and discarding the periods of low or non-response. A final example is the tensor field data generated by diffusion tensor imaging, a relatively new class of image data which shows tremendous promise in many clinical and research applications.

The constraints and challenges that arise in medical imaging, as illustrated in the previous examples, extend to data analysis in other fields. For example, in addition to the challenges previously described, environmental image processing must also differentiate many types of objects whose properties can vary dramatically.

SUMMARY OF THE INVENTION

The present invention provides a comprehensive computer-based approach for optimal and efficient information extraction from image data. The methods and systems described herein extract information about a scene from a set of image data by interdependently smoothing the data, segmenting the imaged scene into coherent elements by determining edges, and estimating attributes present within the scene. One of the strengths of the invention is the ability to learn interesting features of the image data during processing. There are several types of learning embedded within different embodiments of the methods and systems described herein, including estimation of different types of attributes, adaptive neighborhood adjustment, dynamic selection of parametric models for image evaluation, and preferential use of different images or imaging modalities for information extraction. These types of learning will be illustrated in the figures and description below. This invention addresses pressing challenges in many types of imaging, particularly those that include noisy and corrupted representations of unknown elements and diverse types of objects with varying size, shape, orientation and placement. Some immediate applications include retinopathy, stem cell imaging, angiography, diffusion weighted imaging, and solid state and functional MRI.

According to one aspect, the invention relates to a method for segmenting an imaged scene. A set of image data representing a plurality of locations within an imaged scene is stored in a computer database. A computer identifies a plurality of segments within the imaged scene by iteratively adaptively adjusting at least one of a shape and orientation defining a neighborhood associated with each of the plurality of locations and segmenting the imaged scene using the image data and the plurality of adjusted neighborhoods. The computer also outputs the plurality of segments within the imaged scene identified by the iterative process.

According to one embodiment, the plurality of segments within the imaged scene includes an edge value for each of the plurality of locations. In a further embodiment, the edge value is a matrix. In another embodiment, the method includes smoothing the image data, which involves adjusting a smoothed data value for each location based on a data value of at least one other location within the associated neighborhood. In further embodiments, the processes of smoothing and segmenting are interdependent and may be essentially concurrent.

According to another embodiment, the set of image data arises from a plurality of imaging modalities. In another embodiment, a set of prior information about the content of the imaged scene can be specified and used when segmenting the imaged scene.

According to another embodiment, the method involves identifying, for each of at least one attribute, a plurality of attribute segments within the imaged scene by iteratively performing the processes of adaptively adjusting at least one of a shape and orientation defining an attribute neighborhood associated with each of the plurality of locations and segmenting the imaged scene using the image data and the plurality of attribute neighborhoods. In another embodiment, for each of the at least one attribute of the imaged scene, an attribute value may be adjusted for each location based on a data value of at least one other location within the attribute neighborhood. In a further embodiment, the at least one attribute includes at least one of texture, a model parameter, boundary shape and edge strength.

According to another embodiment, the method includes selecting, by the computer, at a plurality of the locations, a parametric model from a plurality of parametric models for evaluating the image data at the respective locations by identifying a parametric model for the location that reduces the value of an energy function associated with an error metric. In another embodiment, the process of adaptively adjusting at least one of a shape and orientation of a neighborhood associated with each of the plurality of locations is performed to reduce the value of an energy function associated with an error metric. In a further embodiment, the error metric includes a penalty for at least one of a mismatch between the smoothed data value and a first transformation of the image data, discontinuity of a first transformation of the smoothed data value within each segment, a first transformation of the edge values, and discontinuity of a second transformation of the edge values. In another embodiment, for each of the at least one attribute of the imaged scene, the process of adaptively adjusting at least one of a shape and orientation of a neighborhood associated with each of the plurality of locations is performed to reduce the value of an energy function associated with an error metric, which may include a penalty for at least one of a mismatch between the smoothed data value and a first transformation of the image data, discontinuity of a first transformation of the smoothed data value within each of the plurality of segments, a first transformation of the edge values, discontinuity of a second transformation of the edge values, discontinuity of a first transformation of the attribute value within each of the plurality of associated segments, a first transformation of the edge values associated with each of the at least one attribute, and discontinuity of a second transformation of the edge values associated with each of the at least one attribute.

According to another embodiment, the method utilizes a weighted combination of the image data for each of the at least one attribute in which the at least one attribute is better observed, wherein the process of utilizing is performed by the computer for each of the plurality of locations. In a further embodiment, the processes of smoothing, segmenting and selecting are interdependent.

In another aspect, the invention relates to a system for segmenting an imaged scene which includes a memory and a processor. Computerized image data representing a plurality of locations within an imaged scene is stored on the memory. The processor is configured to retrieve, from memory, a subset of the computerized image data. The processor is further configured to identify a plurality of segments within the imaged scene by iteratively adaptively adjusting at least one of a shape and orientation defining a neighborhood associated with each of the plurality of locations and segmenting the imaged scene using the image data and the plurality of adjusted neighborhoods. The processor is further configured to output the plurality of segments within the imaged scene identified by the iterative process.

In yet another aspect, the invention relates to a computer readable medium storing computer executable instructions, which, when executed by a processor, cause the processor to carry out a method for segmenting an imaged scene. This method includes storing by the processor, in a computer database, a set of image data representing a plurality of locations within an imaged scene. The method also includes identifying by the processor a plurality of segments within the imaged scene by iteratively adaptively adjusting at least one of a shape and orientation defining a neighborhood associated with each of the plurality of locations and segmenting the imaged scene using the image data and the plurality of adjusted neighborhoods. The method also includes outputting by the processor the plurality of segments within the imaged scene identified by the iterative process.

This application also relates to U.S. patent application Ser. No. 12/321,360, "Image-Based Methods for Measuring Global Nuclear Patterns as Epigenetic Markers of Cell Differentiation,", filed concurrently herewith, the entirety of which is hereby incorporated by reference.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

To provide an overall understanding of the invention, certain illustrative embodiments will now be described, including systems and methods for information extraction from image data. However, it will be understood by one of ordinary skill in the art that the systems and methods described herein can be adapted and modified for other suitable applications and that such other additions and modifications will not depart from the scope hereof.

Figure 1:
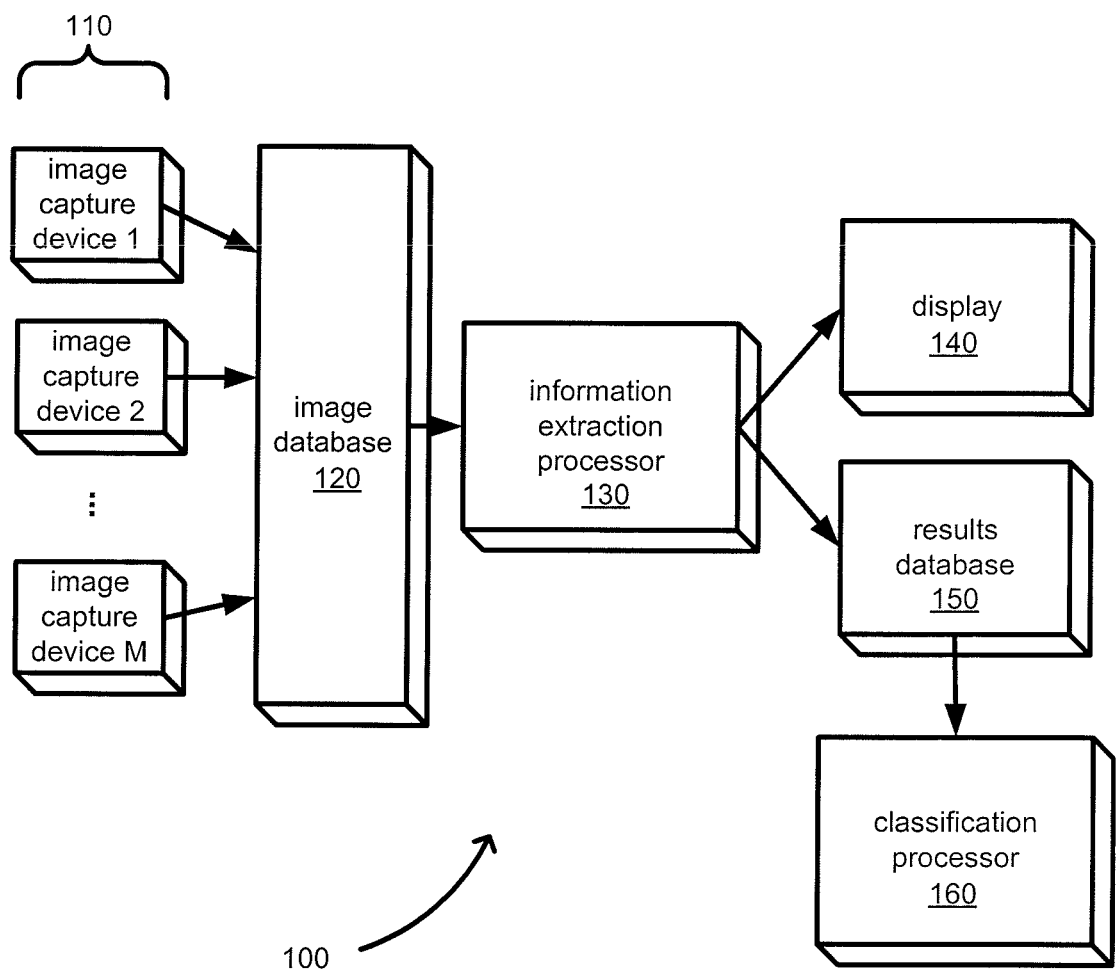
FIG. 1 is a schematic of a system for image analysis according to an illustrative embodiment of the invention.

FIG. 1 is a schematic diagram of an image analysis system, according to an illustrative embodiment of the invention. The system 100 includes image capturing devices 110, image database 120, information extraction processor 130, display 140, results database 150 and classification processor 160.

The system 100 includes at least one image capture device 110 for capturing images of a scene. Exemplary image capture devices 110 include visible light cameras and video recorders; PET, SPECT, MRI, X-ray, CT scanners and other medical imaging apparatus; bright field, phase contrast, atomic force and scanning electron microscopes; satellite radar; thermographic cameras; seismographs; and sonar and electromagnetic wave detectors. Each of the image capturing devices 110 may produce analog or digital images. The image captured by a single image capturing device 110 may be scalar-, vector- or matrix-valued and may vary as a function of time. An imaged scene can include any physical object, collection of physical objects or physical phenomena of interest for which measurements of at least one property can be obtained by an image capturing device. For example, the embryonic environment of a fetus is a scene that can be measured with an ultrasound image capture device. In another example, the position and movement of atmospheric moisture is a scene that can be measured with a satellite radar image capture device.

An image database 120 is used to store the images captured by the image capturing devices 110 as a set of image data. Image database 120 may comprise an appropriate combination of magnetic, optical and/or semiconductor memory, and may include, for example, RAM, ROM, flash drive, an optical disc such as a compact disc and/or a hard disk or drive. One skilled in the art will recognize a number of suitable implementations for image database 120 within system 100, with exemplary embodiments including a database server designed to communicate with processor 130, a local storage unit or removable computer-readable media.

Information extraction processor 130 and database 120 may be embedded within the same physical unit or housed as separate devices connected to each other by a communication medium, such as a USB port, serial port cable, a coaxial cable, a Ethernet type cable, a telephone line, a radio frequency transceiver or other similar wireless or wired medium or combination of the foregoing. Information extraction processor 130 queries database 120 to obtain a non-empty subset of the set of image data. Information extraction processor 130 also performs the information extraction processes described below. Exemplary embodiments of information extraction processor 130 include the software-programmable processors found in general purpose computers, as well as specialized processor units that can be embedded within a larger apparatus. Information extraction processor 130 performs the method described herein by executing instructions stored on a computer-readable medium; one of ordinary skill in the art will recognize that such media include, without limitation, solid-state, magnetic, holographic, magneto-optical and optical memory units. Additional embodiments of information extraction processor 130 and the remaining elements of FIG. 1 are discussed below.

At the completion of the information extraction method, or concurrently with the method, information extraction processor 130 outputs a collection of processed data. Display 140 presents the processed data visually to a user; exemplary embodiments include a computer monitor or other electronic screen, a physical print-out produced by an electronic printer in communication with information extraction processor 130, or a three-dimensional projection or model. Results database 150 is a data storage device in which the processed data is stored for further analysis. Exemplary embodiments include the architectures and devices described for image database 120, as well as others known to those skilled in the art. Classification processor 160 is a data processing device that may optionally extract the processed data from database 150 in order to classify the processed data, i.e. identify the meaning and content of elements in the imaged scene, and may be embodied by the architectures and devices described for information extraction processor 130.

Although the system components 110-160 are depicted in FIG. 1 as separate units, one skilled in the art would immediately recognize that two or more of these units could be practically combined into an integrated apparatus that performs the same overall function. For example, a single physical camera may have both visible and infrared imaging capabilities, and thus represent two image capture devices. A single image processing device may also contain a database 120 for the image data which can directly transmit to processor 130. Similarly, the database 120 and the processor 130 could be configured within a single general purpose computer, as could the processors 130 and 160. Many combinations of the system components within hardware are possible and still remain within the scope of the claimed system. The system components 110-160 can be coupled using communication protocols over physical connections or can be coupled using wireless communication protocols. In one exemplary embodiment, the image data is transmitted from remote image capture devices wirelessly or via an electronic network connection to a data processing facility, where it is stored and processed. In another exemplary embodiment, the system of FIG. 1 is deployed within a vehicle or fleet of vehicles which is capable of using the processed data to make decisions regarding the vehicle or fleet's behavior.

Returning to FIG. 1, one skilled in the art will recognize that many different embodiments of the system components 110-160 are possible, as are many different settings for the system as a whole. In one embodiment, the system of FIG. 1 resides in a laboratory or medical research setting and is used to improve patient diagnosis using image data from, for example, perfusion imaging, fMRI, multi-spectral or hyper-spectral imaging, bright field microscopy or phase contrast microscopy. In another embodiment, the system of FIG. 1 resides in a monitoring station and is used to assess conditions in a particular geographical area by combining data from at least one imaging device. These devices may include satellite radar, aerial photography or thermography, seismographs, sonar or electromagnetic wave detectors. In another embodiment, the system of FIG. 1 can be configured for any general purpose computer to meet the hardware requirements and extract information from image data arising from a user's particular application.

Figure 2:
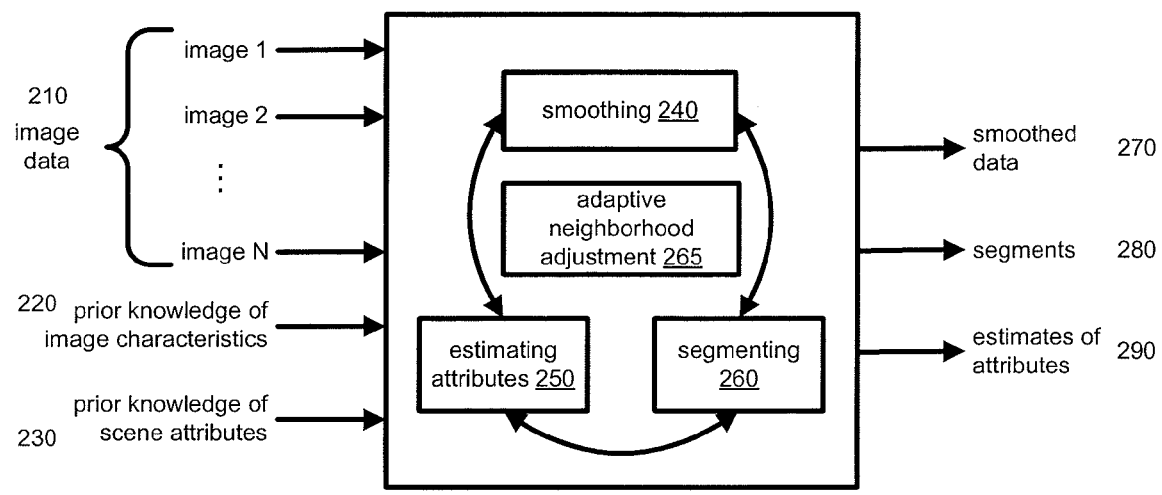
FIG. 2 is a diagram of an illustrative process for generating smoothed data, segments, and attribute estimates according to an embodiment of the invention.

The information extraction processor 130 is configured to extract information about the elements in an imaged scene by smoothing the image data to improve the representation of the scene, segmenting the image data to distinguish elements within the scene by determining edges between these elements, and estimating the attributes of the elements within the scene, using adaptively adjusted neighborhoods. FIG. 2 depicts one illustrative embodiment of the information extraction method performed by the information extraction processor 130. Inputs to the information extraction processor 130 include image data 210 comprising images 1, 2, . . . , N; prior knowledge of the characteristics of the image data 220; and prior knowledge of the attributes in the imaged scene 230. Prior knowledge of the characteristics of the image data 220 includes noise intensity and distribution information, models of the imaged scene, environmental factors, and properties of the imaging equipment. Prior knowledge of the attributes in the imaged scene 230 includes locations within the scene that have known attributes, knowledge of the presence or absence of elements within the imaged scene, real-world experience with the imaged scene, or any probabilistic assessments about the content of the imaged scene. The processes of smoothing 240, segmenting 250 and attribute estimation 260 are interdependent in the sense that the processor considers the outcome of each of these processes in performing the others. Adaptive adjustment of neighborhoods 265 will be discussed in greater detail below. In addition, the processes are carried out concurrently or substantially concurrently. At the conclusion of these processes, the information extraction processor 130 outputs a collection of processed data comprising a set of smoothed data 270, a set of segments dividing the imaged scene into coherent elements 280, and a set of estimated attributes present within the scene 290. Each of the processes 240, 250, and 260 will be discussed in more detail below.

The smoothing process 240 generates a set of smoothed data 270 from the image data. Smoothed data 270 represents the most accurate estimate of the true characteristics of the imaged scene. Images are often corrupted by noise and by distortions from the imaging equipment, and consequently, the image data is never a perfect representation of the true scene. When performing smoothing 240, the processor 130 takes into account, among other factors, the image data, physical models of the imaged scene, characteristics of the noise arising at all points between the imaged scene and the database 120, as well as the results of the segmenting process 250 and attribute estimation process 260.

The segmenting process 250 demarcates distinct elements within the imaged scene by drawing edges that distinguish one element from another. For example, the segmenting process may distinguish between an object and its background, several objects that overlap within the imaged scene, or regions within an imaged scene that exhibit different attributes. The segmenting process results in a set of edges that define the segments 280. These edges may be scalar, vector, or matrix-valued, or may represent other data types. When performing segmenting 250, the information extraction processor 130 takes into account, among other factors, the image data 210, physical models of the imaged scene, characteristics of the noise arising at all points between the imaged scene and the image database 120, as well as the results of the smoothing process 240 and attribute estimation process 260.

The attribute estimation process 260 identifies properties of the elements in the imaged scene. An attribute is any property of an object about which the image data contains some information. The set of available attributes depends upon the imaging modalities represented within the image data. For example, a thermographic camera generates images from infrared radiation; these images contain information about the temperature of objects in the imaged scene. Additional examples of attributes include texture, radioactivity, moisture content, color, and material composition, among many others. For example, the surface of a pineapple may be identified by the processor as having a texture (the attribute) that is rough (a value of the attribute). In one embodiment, the attribute of interest is the parameter underlying a parameterized family of models that describe the image data. In another embodiment, the attribute of interest is the parametric model itself. When performing attribute estimation, the information extraction processor 130 takes into account, among other factors, the image data 210, physical models of the imaged scene, characteristics of the noise arising at all points between the imaged scene and the image database 120, as well as the results of the smoothing process 240 and segmenting process 250.

When more than one image is represented in the image data, the information extraction processor 130 may also determine, for a particular attribute, the relative amounts of information contained in each image. When estimating this attribute, the information extraction processor 130 may then utilize each image according to its information content regarding the attribute. For example, multi-spectral imaging returns multiple images, each of which was produced by a camera operating in particular wavelength bands. Different attributes may be better represented in one frequency band than another. For example, satellites use the 450-520 nm wavelength range to image deep water, but the 1550-1750 nm wavelength range to image ground vegetation. Additionally, the information extraction processor 130 may use statistics of the image data to identify images of particular relevance to an attribute of interest. For example, one or more different weighted combinations of image data may be identified as having more information content as compared to other combinations for any particular attribute. The present invention allows the attribute estimation process, interdependently with the smoothing and segmenting processes, to preferentially utilize data from different images.

Additionally, the information extraction processor 130 may preferentially utilize data in different ways at different locations in the imaged scene for any of the smoothing, segmenting and attribute estimation processes. For example, if each image in a data set corresponds to a photograph of a person taken at a different angle, only a subset of those images will contain information about the person's facial features. Therefore, these images will be preferentially used by information extraction processor 130 to extract information about the facial region in the imaged scene. The information extraction method presented herein is capable of preferentially utilizing the image data to resolve elements in the imaged scene at different locations, interdependently with the smoothing, segmenting and attribute estimation processes.

It is important to note that the number of attributes of interest and the number of images available can be independent. For example, several attributes can be estimated within a single image, or multiple images may be combined to estimate a single attribute.

Figure 3:
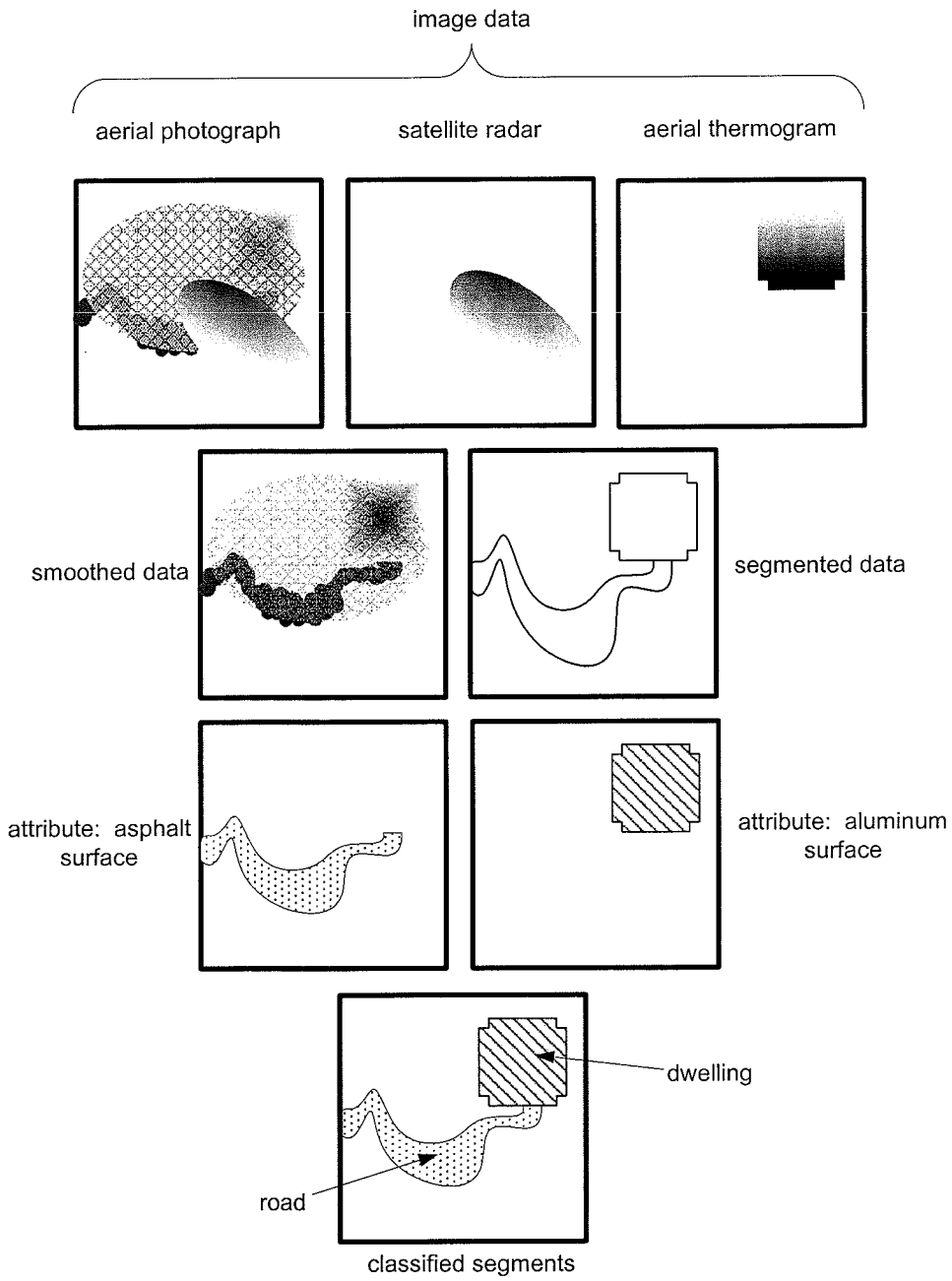
FIG. 3 illustrates the information extraction method as applied to example image data in accordance with an embodiment of the invention.

To more clearly describe the information extraction method, an example is helpful. FIG. 3 depicts three images 310, 320, 330 for processing by the image analysis system of FIG. 1 according to the methodology of FIG. 2. These three images represent the same scene; image 310 is an aerial photograph, image 320 is a satellite radar image of cloud cover, and image 330 is an aerial thermogram (which measures the thermal radiation emitted by elements in the scene). These three images represent three different imaging modalities, i.e. ways of capturing information about a scene, and are therefore capable of detecting more kinds of phenomena than a single modality. In the example, image 320 shows the presence of a cloud. Image 330 reveals an area of high thermal radiation, which may be characteristic of a dwelling within the scene. A dwelling is difficult to detect in image 310 because it is obscured by foliage and cloud cover. One of the strengths of the present information extraction method is the ability to combine multiple modalities to best reveal the underlying elements in the scene. The combination of different modalities will be discussed in more detail below.

Information extraction processor 130 obtains these three images from database 120, then outputs a set of smoothed data 270, a set of segments within the scene 280, and an estimate of the attributes within the scene 290. If the objective is to obtain the truest representation of the structures on the ground, the set of smoothed data 270 may be as depicted in illustration 340. To generate smoothed data 270, the information extraction processor 130 has removed the obscuring foliage and used the information about cloud cover from image 320 and the potential presence of a dwelling from image 330 to produce a clearer illustration of the ground structures. Segmenting the image data may result in the set of segmented data 280 depicted in illustration 350, where the outlines of the dwelling and a road are identified. Depending upon the interests of the user, information extraction processor 130 may also smooth and segment additional elements within the scene, such as the foliage in image 310 or the cloud in image 320. Information extraction processor 130 may also identify the materials used to construct each of the dwelling and road via the attribute estimation process 260 as depicted in illustration 360. As discussed in more detail below, the attribute estimation process 260 may use different neighborhoods via the adaptive neighborhood adjustment process 265 to identify the "asphalt" and "aluminum" surfaces within the imaged scenes. Once the processed data is available, classification processor 160 may be used to classify the elements in the imaged scene; for example, illustration 370 identifies a "road" and a "dwelling" within the imaged scene, using the results of all of the smoothing, segmenting and attribute estimation processes 240-260. Additional embodiments of the smoothing, segmenting and attribute estimation processes 240-260 are described below.

When producing a set of smoothed data 270 from noisy images, or classifying segments according to their attribute values, it is desirable to be able to distinguish which locations within the imaged scene correspond to edges and which do not. When an edge is identified, the information extraction processor 130 can then treat locations on either side of that edge and on the edge itself separately, improving smoothing and classification performance. It is desirable, then, to use local information preferentially during the smoothing, segmenting and attribute estimation processes. Thus, in one embodiment, decisions are made at each location based on a neighborhood of surrounding locations in an adaptive neighborhood adjustment process 265. One embodiment of the present invention associates a neighborhood with each particular location in an imaged scene. Each neighborhood includes a number of other locations near the particular location. Information extraction processor 130 can then use the neighborhood of each location to focus the smoothing, segmenting and attribute estimation processes 240-260 to more appropriately extract information about the location. In its simplest form, the neighborhoods associated with each location could have a fixed size, shape and orientation, e.g. a circle with a fixed radius. However, using an inflexible neighborhood size and shape has a number of drawbacks. For example, if a location is located on an edge, then the smoothing and attribute estimation processes that rely on the fixed neighborhood will use information from the scene elements on either side of the edge, leading to spurious results. One improvement is adjusting the size of the neighborhood of each location based on local information. A further improvement comprises adjusting the size, shape and orientation of the neighborhood of a location to better match the local characteristics in an adaptive neighborhood adjustment process 265. These examples will be described in greater detail below.

In one embodiment, information extraction processor 130 performs the information extraction method while adjusting the size, shape and orientation characteristics of neighborhoods surrounding locations in the imaged scene. In particular, the processor 130 adapts the characteristics of the neighborhoods associated with each location interdependently with the smoothing, segmenting and attribute estimation processes 240-260. In another embodiment, the information extraction processor 130 utilizes separate independently adapted neighborhoods for each attributed analyzed by the information extraction processor 130.

Figure 4A:
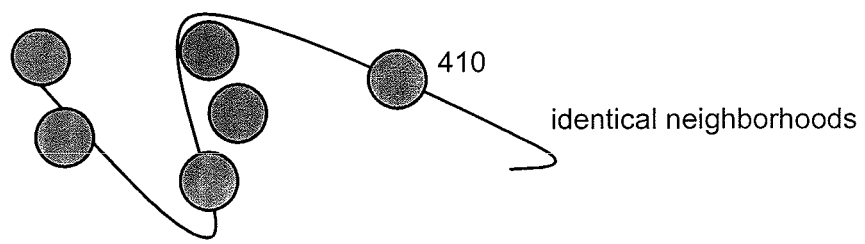
FIGS. 4A-4C depict three different approaches to neighborhood adaptation according to an illustrative embodiment of the invention.
Figure 4B:
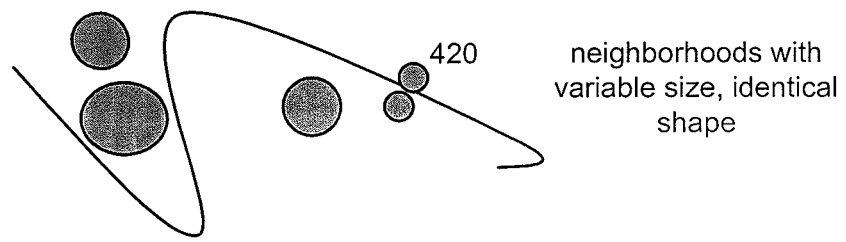
Figure 4C:
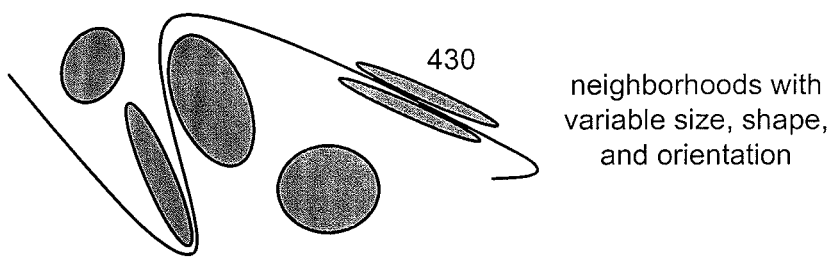

The benefits of using adaptive neighborhood size, shape and orientation can be seen in FIGS. 4A-4C and FIG. 5. FIGS. 4A-4C illustrate three different neighborhood-based approaches. Each example FIGS. 4A-4C depicts an edge and several illustrative neighborhoods 410-430 at corresponding locations. The first example illustrates an approach in which the neighborhoods 410 associated with each location in the imaged scene are identical. In FIG. 4A, all neighborhoods 410 are circles centered at the location with a fixed radius. In FIG. 4B, all neighborhoods 420 are circular, but with radii that are allowed to vary in order to avoid a neighborhood 420 overlapping an edge. In FIG. 4C, an exemplary embodiment of the invention, neighborhoods 430 are ellipses which are allowed to vary in their size, shape and orientation to better adapt to the characteristics of the local area, with the adaptation occurring interdependently with the smoothing process.

To demonstrate the improvement that such adaptation can provide, consider an exemplary embodiment of the information extraction method which includes an averaging step within the smoothing process 240 to reduce noise present in the raw image data. The averaging step produces a smoothed data value at each location (with an associated neighborhood) by replacing the image data value at that location with the average of the image data values at each of the locations that fall within the associated neighborhood.

With reference to FIGS. 4A-4C, this averaging will take place over the indicated neighborhoods 410-430. In FIG. 4A, averaging will occur over edge values and across segments, blurring the distinction between segments. A mathematical formulation in accordance with the neighborhood 410 is given by $$\min_u \int_R (\alpha u_X^T u_X + \beta(u-g)^2) dX$$

wherein g is the image data, u is the smoothed data, α, β are adjustable parameters and the integral is taken over all locations X in region R.

In FIG. 4B, locations near the edge have associated neighborhoods 420 that are necessarily small to avoid overlapping an edge, and thus are more susceptible to noise. A mathematical formulation in accordance with the neighborhood 420 is given by $$\min_{u,v} \int_R \left[ \alpha(1-v)^2 u_X^T u_X + \beta(u-g)^2 + \frac{\rho}{2} v_X^T v_X + \frac{v^2}{2\rho} \right] dX$$

wherein g is the image data, u is the smoothed data, v is the edge values and α, β, ρ are adjustable parameters. A method related to that illustrated in FIG. 4B was used to analyze diffusion tensor imaging data of the human brain by Desai et al. in "Model-based variational smoothing and segmentation for diffusion tensor imaging in the brain," *Neuroinformatics*, v. 4 2006, which is hereby incorporated by reference herein in its entirety.

In FIG. 4C, where size, shape and orientation are allowed to vary, averaging across an edge is prevented while allowing each location to selectively identify a neighborhood 430 over which to average, improving noise-reduction performance. A mathematical formulation in accordance with the neighborhood 430 is given by $$\min_{u,V,w} \int_R \left[ \alpha u_X^T (I-V)^2 u_X + \beta(1-w)^2 \|u-g\|_2^2 + \frac{\rho}{2} F(V_X) + \frac{G(V)}{2\rho} + \frac{\rho_w}{2} w_X^T w_X + \frac{w^2}{2\rho_w} \right] dX$$

wherein g is the image data, u is the smoothed data; V is a symmetric, positive-definite 2×2 matrix representing the neighborhood; w weights the data fidelity terms; F and G are functions, and α, β, ρ, $\rho_w$ are adjustable parameters. The information extraction processor 130 can also use information arising from the smoothing and attribute estimation processes 150-160 to adjust the size, shape and orientation of neighborhoods.

Figure 5:
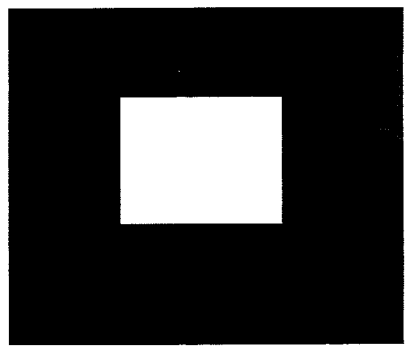
FIG. 5 demonstrates the improvements achievable by the invention in the detection of image elements in the presence of noise.
Figure 5:
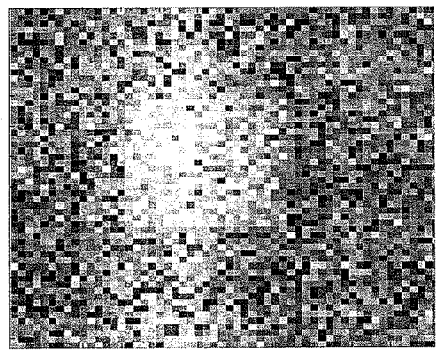
Figure 5:
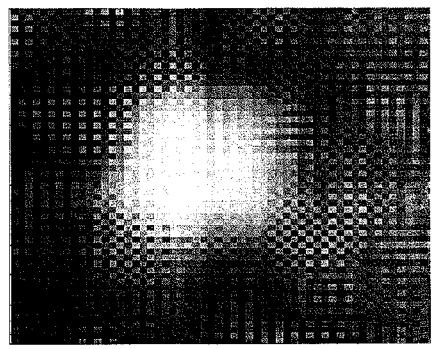
Figure 5:
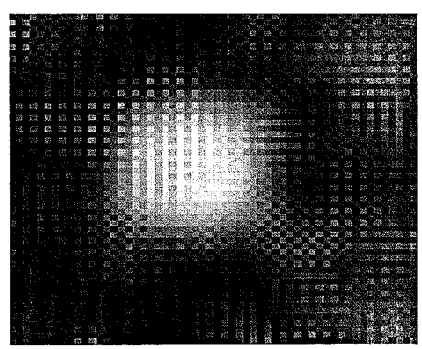
Figure 5:
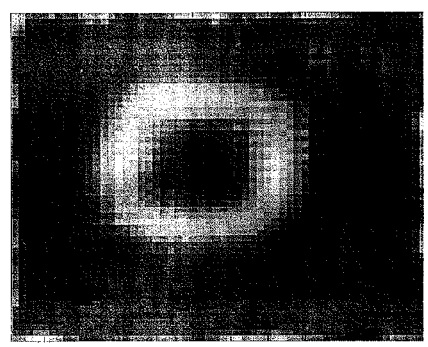
Figure 5:
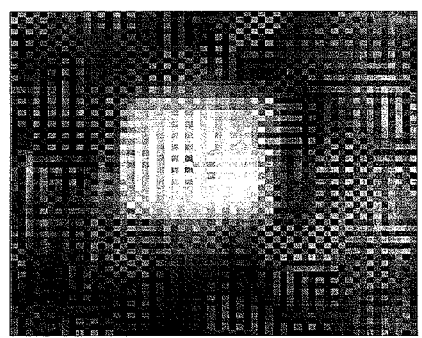
Figure 5:
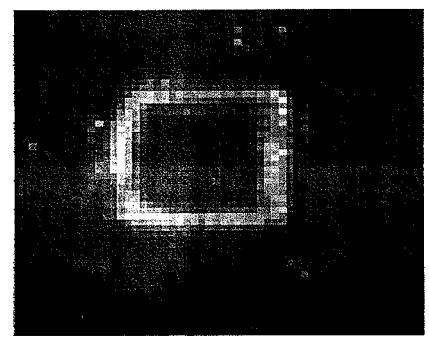

FIG. 5 demonstrates the performance improvements achievable with adaptive neighborhoods like the third neighborhood 430 as illustrated in FIG. 4C. An original scene of a white square on a black background 510 is corrupted by noise in the imaging process, resulting in a noisy image 520. In the noisy image 520, it is difficult to distinguish the square from the background with the human eye. The smoothing method of the first example 410 is applied to generate a first smoothed image 530. This method does not produce a set of edges, and the resulting smoothed data blurs the boundaries of the white rectangle. The smoothing method of the second example 420 is applied to generate a second smoothed image 540 and a set of scalar edges 550. To the human eye, the second smoothed image 540 is as indistinct as the first smoothed image 530, and the scalar edges 550 are diffuse.

The smoothing method of the third example 430, an exemplary embodiment of the invention, results in the third smoothed image 560 and a matrix-valued edge associated with each pixel. Because the edges are matrix-valued, it is not possible to represent them in the same manner as the set of scalar edges 550. One meaningful scalar value associated with the edge matrix is its trace, and therefore the third example 430 can be associated with the set of traces of the matrix-valued edges 570. Additional embodiments of the invention include examining functions of the eigenvalues and eigenvectors of a matrix-valued edge for boundary information. The third smoothed image 560 is much sharper than the first or second smoothed images 530 and 540, and the boundary much more clearly delineated by the set of traces of the matrix-valued edges 570 than the set of scalar edges 550. The ability of the third example to adapt the size, shape and orientation of the neighborhood interdependently with the smoothing process allows for the improved information extraction performance demonstrated in FIG. 5.

Figure 6:
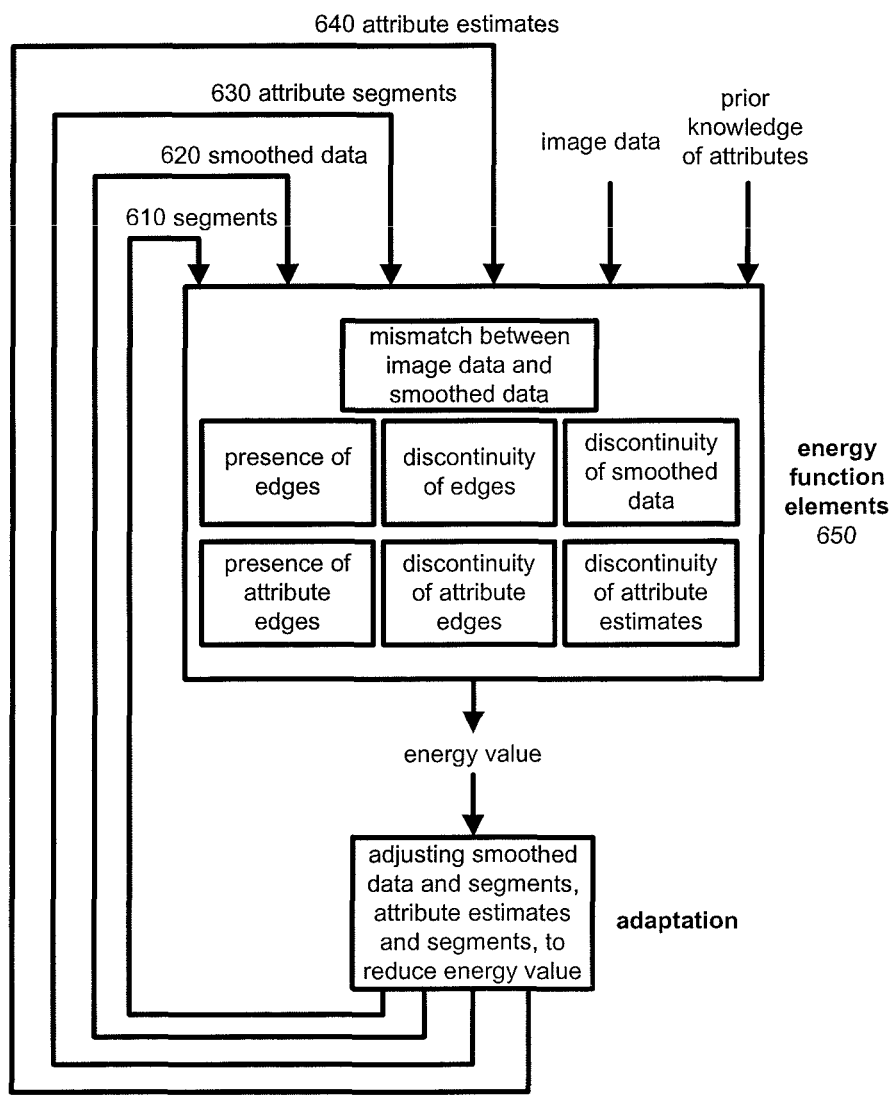
FIG. 6 illustrates a method for generating smoothed data, segments and attribute estimates by minimizing an energy function according to an illustrative embodiment of the invention.

One particular embodiment of the information extraction method is illustrated in FIG. 6. As discussed above, the neighborhood adaptation process can take place for each of the attributes of interest. At each location, a different neighborhood can be determined for each attribute, which allows the identification of attribute values and attribute edge values for each attribute. FIG. 6 depicts an iterative process which takes as inputs the image data, prior knowledge of attributes, segments (and associated edges) within the image data 610, smoothed image data 620, segments (and associated edges) within the attribute estimates 630, and attribute estimates 640. To begin to apply the iterative process of FIG. 6, initial values for the inputs 610, 620, 630 and 640 can be specified by a user or automatically selected by the processor 130. The adaptation process seeks to minimize an energy function which includes penalties for undesirable performance. Several example penalties that could be included in the energy function are depicted in energy function elements block 650. These include penalties for mismatch between image data and smoothed data; penalties for the designation of excessive edges within the data; penalties for the designation of excessive edges within the attribute; penalties for the discontinuity or non-smoothness of edges within the data; penalties for the discontinuity or non-smoothness of edges within the attribute; discontinuity or abrupt changes in the smoothed data; and discontinuity or abrupt changes in attribute estimates. Using the inputs to the energy function, an energy value can be calculated, then inputs 610, 620, 630 and 640 are adaptively adjusted to achieve a lower energy value.

In one implementation of this embodiment, the determination of the energy value is calculated in accordance with the following expression:

$$\min_{u,\upsilon_u,\theta,\upsilon_\theta} \int\int [e_1+e_2+e_3+e_4+e_5]\partial x\partial y$$

where $e_1$, $e_2$, $e_3$, $e_4$, $e_5$ are error terms as described below. Values for the smoothed data u, the edges of the segments $\upsilon_u$, attribute $\theta$ and the edges of the attribute segments $\upsilon_\theta$, are chosen for each (x, y) coordinate in order to minimize the expression contained in square brackets, integrated over the entire plane. This expression relies on the image data g, a data function $T(\theta)$ with attribute $\theta$, and parameters $\lambda_u$, $\alpha_u$, $\rho_u$, $\lambda_\theta$, $\alpha_\theta$, $\rho_\theta$, where $$e_1 = |g - T(\theta)u|^2,$$

$$e_2 = \lambda_u|\nabla u|^2(1-\upsilon_u)^2,$$

$$e_3 = \alpha_u\left(\rho_u|\nabla \upsilon_u|^2 + \frac{\upsilon_u^2}{\rho_u}\right),$$

$$e_4 = \lambda_\theta|\nabla \theta|^2(1-\upsilon_\theta)^2,$$

and $$e_5 = \alpha_\theta\left(\rho_\theta|\nabla \upsilon_\theta|^2 + \frac{\upsilon_\theta^2}{\rho_\theta}\right).$$

The term $e_1$ is a penalty for a mismatch between the image data and the smoothed data, the term $e_2$ is a penalty for discontinuity in the smoothed data, the term $e_3$ includes penalties for the presence of an edge and the discontinuity of the edge, the term $e_4$ is a penalty for discontinuity in the attribute estimate and the term $e_5$ includes penalties for the presence of an attribute edge and the discontinuity of the attribute edge. One skilled in the art will recognize that there are many additional penalties that could be included in the energy function, and that the choice of appropriate penalties depends upon the application at hand. Equivalently, this problem could be expressed as the maximization of a reward function, in which different reward terms correspond to different desirable performance requirements for the information extraction method. There are many standard numerical techniques that could be readily applied to this specific mathematical formulation by one skilled in the art: for example, gradient descent methods. These techniques could be implemented in any of the embodiments described herein.

In another embodiment, the calculation of the minimum energy value is performed in accordance with the following expression:

$$\min_{u,w,\upsilon_m,\upsilon_u,\upsilon_c,\theta_u,\theta_m} \int \ldots \int\int [e_1+e_2+e_3+e_4+e_5]\partial x_1\partial x_2 \ldots \partial x_N\partial t$$

where $e_1$, $e_2$, $e_3$, $e_4$, $e_5$ are error terms as described below. Values for the smoothed data u, the edges of the segments w, the edge field of the measurement model parameters $\upsilon_m$, the edge field of the process model parameters $\upsilon_u$, the edge field of the measurement model parameters $\upsilon_m$, the edge field of the process parameter correlations $\upsilon_c$, the process model parameters $\theta_u$, and the measurement model parameters $\theta_m$ are chosen for each $(x_1, x_2, \ldots, x_N, t)$ coordinate in order to minimize the expression contained in square brackets, integrated over the entire N-dimensional image data space augmented with a one-dimensional time variable. The error terms are given by $$e_1 = \beta M(u,g,w,\theta_m),$$

$$e_2 = \alpha_m L_m(\theta_m,\upsilon_m)$$

$$e_3 = \alpha_u C_u(u,\upsilon_u,\theta_u),$$

$$e_4 = \alpha_c L_c(\upsilon_c,\theta_u), \text{ and}$$

$$e_5 = \pi(u,w,\upsilon_m,\upsilon_c,\theta_u,\theta_m)$$

where M is a function that measures data fidelity, $L_m$ estimates measurement model parameters, $C_u$ measures process model spatial correlation, $L_c$ estimates process model parameters, $\pi$ represents prior distributions of the unknown variables and β, $\alpha_m$, $\alpha_u$, $\alpha_c$ are parameters that allow the process to place different emphasis on the terms $e_1$, $e_2$, $e_3$, $e_4$.

The invention may be embodied in other specific forms without departing form the spirit or essential characteristics thereof. The forgoing embodiments are therefore to be considered in all respects illustrative, rather than limiting of the invention.

What is claimed is:

1. A method for segmenting an image comprising:
   storing, in a computer database, a set of image data representing a plurality of pixel locations within an image;
   associating a respective neighborhood with each of the plurality of pixel locations in the stored image data;
   identifying, by a computer, a plurality of segments within the image by iteratively performing the processes of:
     individually adjusting an orientation and at least one of a shape and a size of a plurality of the neighborhoods;
     for each pixel location and associated neighborhood, obtaining a smoothed data value for the pixel location based on data values of the other pixel locations within the associated neighborhood; and
     segmenting the image using the image data, the obtained smoothed data values, and the plurality of adjusted neighborhoods; and
   outputting, by the computer, the plurality of segments within the image identified by the iterative process.

2. The method of claim 1, wherein a plurality of segments within the image comprises an edge value for each of the plurality of pixel locations.

3. The method of claim 1, wherein the processes of smoothing and segmenting are interdependent.

4. The method of claim 3, wherein the processes of smoothing and segmenting are substantially concurrent.

5. The method of claim 4, further comprising, for each of at least one attribute, identifying, by the computer, a plurality of attribute segments within the image by iteratively performing the processes of individually adjusting an orientation and at least one of a shape and a size defining an attribute neighborhood associated with each of the plurality of pixel locations and segmenting the image using the image data and the plurality of attribute neighborhoods.

6. The method of claim 5, wherein the at least one attribute includes at least one of texture, a model parameter, boundary shape and edge strength.

7. The method of claim 5, further comprising, for each of the at least one attribute of the image, adjusting an attribute value for said pixel location based on a data value of at least one other pixel location within the attribute neighborhood.

8. The method of claim 7, wherein, for each of the at least one attribute of the image, the process of individually adjusting an orientation and at least one of a shape and a size of a plurality of the neighborhoods associated with each of the plurality of pixel locations comprises reducing the value of an energy function associated with an error metric.

9. The method of claim 8, wherein the error metric includes a penalty for at least one of a mismatch between the smoothed data value and a first transformation of the image data, discontinuity of a first transformation of the smoothed data value within each of the plurality of segments, a first transformation of the edge values, discontinuity of a second transformation of the edge values, discontinuity of a first transformation of the attribute value within each of the plurality of associated segments, a first transformation of the edge values associated with each of the at least one attribute, and discontinuity of a second transformation of the edge values associated with each of the at least one attribute.

10. The method of claim 7, further comprising utilizing, with the computer, a weighted combination of the image data for each of the at least one attribute in which the at least one attribute is better observed, wherein the process of utilizing is performed for each of the plurality of pixel locations.

11. The method of claim 10, wherein the processes of smoothing and segmenting are interdependent.

12. The method of claim 2, wherein the edge value is a matrix.

13. The method of claim 1, wherein the set of image data comprises data obtained via a plurality of imaging modalities.

14. The method of claim 1, further comprising specifying a set of prior information about the content of the image and segmenting the image using the image data, the plurality of adjusted neighborhoods and the set of prior information.

15. The method of claim 1, wherein the process of individually adjusting an orientation and at least one of a shape and a size of a plurality of the neighborhoods associated with each of the plurality of pixel locations comprises reducing the value of an energy function associated with an error metric.

16. The method of claim 15, wherein the error metric includes a penalty for at least one of a mismatch between the smoothed data values and a first transformation of the image data, discontinuity of a first transformation of the smoothed data values within each segment, a first transformation of edge values, and discontinuity of a second transformation of the edge values.

17. The method of claim 1, comprising selecting, by the computer, at a plurality of the pixel locations, a parametric model from a plurality of parametric models for evaluating the image data at the respective pixel locations by identifying a parametric model for the pixel location that reduces the value of an energy function associated with an error metric.

18. The method of claim 1, wherein each neighborhood corresponds to a plurality of pixel locations surrounding its respective pixel location.

19. A system for segmenting an image, the system comprising:
   a memory;
   computerized image data representing a plurality of pixel locations within an image stored on the memory;
   a processor configured to:
     retrieve from memory a subset of the computerized image data;
     associate a respective neighborhood with each of the plurality of pixel locations in the stored image data;
     identify a plurality of segments within the image by iteratively performing the processes of:
       individually adjusting an orientation and at least one of a shape and a size of a plurality of the neighborhoods;
       for each pixel location and associated neighborhood, obtaining a smoothed data value for the pixel location based on data values of the other pixel locations within the associated neighborhood; and
       segmenting the image using the image data, the obtained smoothed data values, and the plurality of adjusted neighborhoods; and
     output the plurality of segments within the imaged scene identified by the iterative process.

20. The system of claim 19, wherein the plurality of segments within the image comprises an edge value for each of the plurality of pixel locations.

21. The system of claim 20, wherein the processes of smoothing and segmenting are interdependent and substantially concurrent.

22. The system of claim 21, wherein the processor is further configured to, for each of at least one attribute, identify a plurality of attribute segments within the image by iteratively performing the processes of individually adjusting an orientation and at least one of a shape and a size defining an attribute neighborhood associated with each of the plurality of pixel locations, adjust an attribute value for said pixel location based on a data value of at least one other pixel location within the attribute neighborhood, and segment the image using the image data and the plurality of attribute neighborhoods.

23. The system of claim 22, wherein the at least one attribute includes at least one of texture, a model parameter, boundary shape and edge strength.

24. The system of claim 22, wherein the processor is further configured to utilize a weighted combination of the image data for each of the at least one attribute in which the at least one attribute is better observed, wherein the process of utilizing is performed for each of the plurality of pixel locations.

25. The system of claim 19, wherein the processor is further configured to specify a set of prior information about the content of the image and segment the image using the image data, the plurality of adjusted neighborhoods and the set of prior information.

26. The system of claim 19, wherein individually adjusting an orientation and at least one of a shape and a size of a neighborhood associated with each of the plurality of pixel locations comprises reducing the value of an energy function associated with an error metric.

27. The system of claim 19, wherein the processor is further configured to select at a plurality of the pixel locations, a parametric model from a plurality of parametric models for evaluating the image data at the respective pixel locations by identifying a parametric model for the pixel location that reduces the value of an energy function associated with an error metric.

28. A non-transitory computer readable medium storing computer executable instructions, which, when executed by a processor, cause the processor to carry out a method for segmenting an image comprising:
storing by the processor, in a computer database, a set of image data representing a plurality of pixel locations within an image;
associating a respective neighborhood with each of the plurality of pixel locations in the stored image data;
identifying by the processor a plurality of segments within the image by iteratively performing the processes of:
individually adjusting an orientation and at least one of a shape and a size of a plurality of the neighborhoods;
for each pixel location and associated neighborhood, obtaining a smoothed data value for the pixel location based on data values of the other pixel locations within the associated neighborhood; and
segmenting the image using the image data, the obtained smoothed data values, and the plurality of adjusted neighborhoods; and
outputting by the processor the plurality of segments within the image identified by the iterative process.

29. The non-transitory computer readable medium of claim 28, wherein the plurality of segments within the image comprises an edge value for each of the plurality of pixel locations.

30. The non-transitory computer readable medium of claim 28, wherein the processes of smoothing and segmenting are interdependent and substantially concurrent.

31. The non-transitory computer readable medium of claim 30, storing instructions for causing the processor to, for each of at least one attribute, identify a plurality of attribute segments within the image by iteratively performing the processes of individually adjusting an orientation and at least one of a shape and a size defining an attribute neighborhood associated with each of the plurality of pixel locations, adjust an attribute value for said pixel location based on a data value of at least one other pixel location within the attribute neighborhood, and segment the image using the image data and the plurality of attribute neighborhoods.

32. The non-transitory computer readable medium of claim 31, wherein the at least one attribute includes at least one of texture, a model parameter, boundary shape and edge strength.

33. The non-transitory computer readable medium of claim 31, storing instructions for causing the processor to utilize a weighted combination of the image data for each of the at least one attribute in which the at least one attribute is better observed, wherein the process of utilizing is performed for each of the plurality of pixel locations.

34. The non-transitory computer readable medium of claim 28, storing instructions for causing the processor to specify a set of prior information about the content of the imaged scene and segment the imaged scene using the image data, the plurality of adjusted neighborhoods and the set of prior information.

35. The non-transitory computer readable medium of claim 28, wherein individually adjusting an orientation and at least one of a shape and a size of a plurality of the neighborhoods associated with each of the plurality of pixel locations comprises reducing the value of an energy function associated with an error metric.

36. The non-transitory computer readable medium of claim 28, storing instructions for causing the processor to select at a plurality of pixel locations, a parametric model from a plurality of parametric models for evaluating the image data at the respective pixel locations by identifying a parametric model for the pixel location that reduces the value of an energy function associated with an error metric.

* * * * *